United States Patent [19]

Steffen

[11] 4,069,651
[45] Jan. 24, 1978

[54] REVOLVING PROTECTIVE BLADE ENCLOSURE

[76] Inventor: Richard S. Steffen, 401 N. Wood St., Forrest, Ill. 61741

[21] Appl. No.: 682,898

[22] Filed: May 4, 1976

Related U.S. Application Data

[63] Continuation-in-part of Ser. No. 536,421, Dec. 26, 1974, abandoned.

[51] Int. Cl.² ............................................. A01D 35/26
[52] U.S. Cl. .................................................... 56/320.1
[58] Field of Search ................... 56/320.1, 320.2, 255, 56/17.4, 17.5, 10.4, 503, 295; 30/286

[56] References Cited

U.S. PATENT DOCUMENTS

| | | | |
|---|---|---|---|
| 594,776 | 11/1897 | Burnham | 30/286 |
| 2,491,768 | 12/1949 | Roof | 56/320.1 |
| 2,504,259 | 4/1950 | Ford | 56/17.4 |
| 2,851,842 | 9/1958 | Harp | 56/10.4 X |

Primary Examiner—Jay N. Eskovitz
Attorney, Agent, or Firm—Blair & Brown

[57] ABSTRACT

An enclosure mountable on a rotary type lawn mower for completely isolating the rotating blade so that it cannot be accidentally contacted by a person's hands or feet, nor the blade be readily hit against upward projecting rocks; the enclosure consisting of a circular metal shield from the periphery of which steel fingers extend radially and downwardly so to form a cage within which the blade swings, the shield having a central opening for fitting on and rotating with respect to the motor shaft housing and positioned above the blade so to rotate and spread the cut grass as it moves outwardly from the blade and rotate on engaging an object as well as rotate due to the reaction of the uncut grass on the fingers during a grass cutting operation.

3 Claims, 6 Drawing Figures

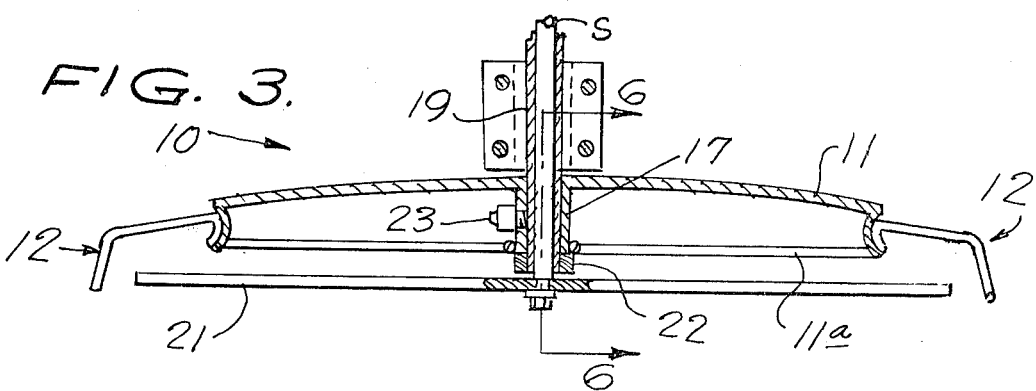
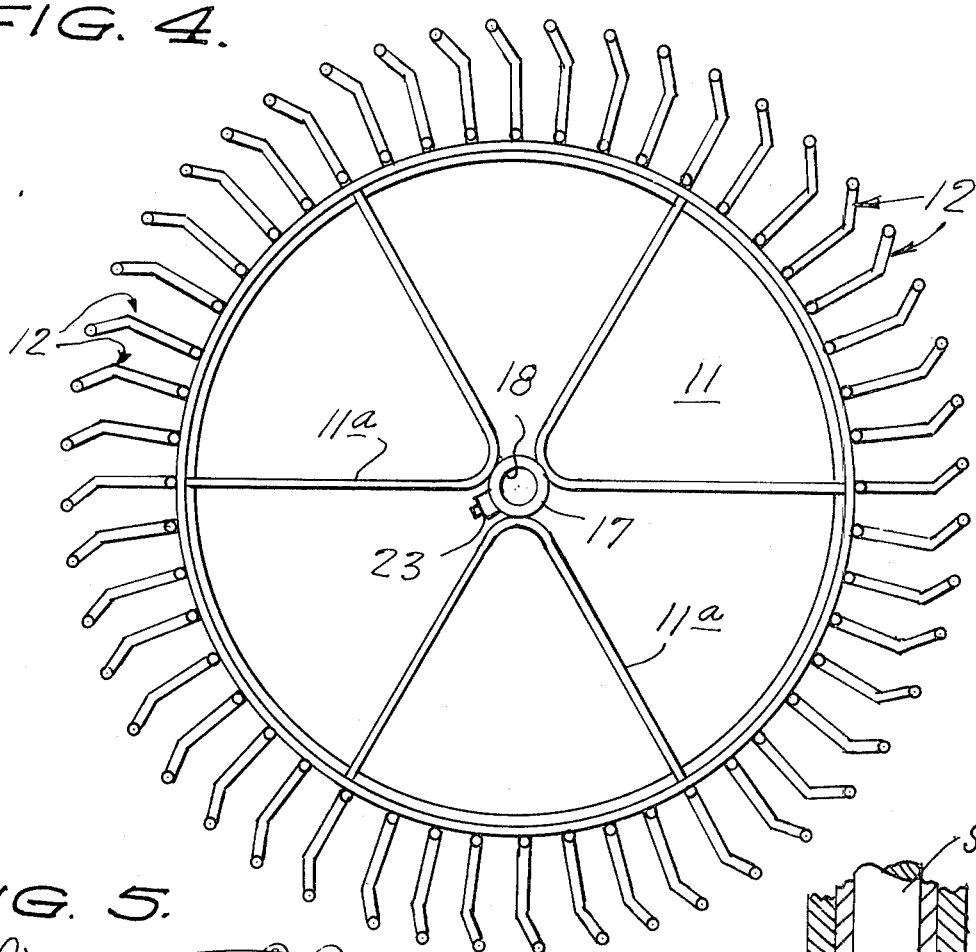
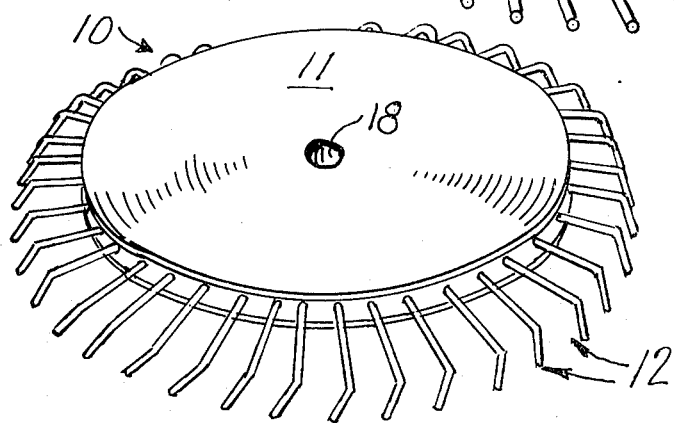
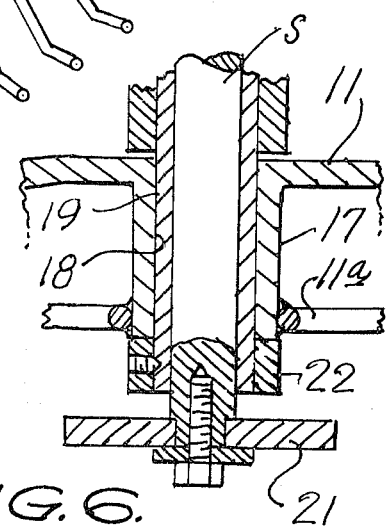

REVOLVING PROTECTIVE BLADE ENCLOSURE

CROSS REFERENCE TO RELATED APPLICATION

This application is a continuation-in-part of my copending application Ser. No. 536,421 filed 12/26/74 entitled Revolving Protective Blade Enclosure and now abandoned.

This invention relates generally to protective devices for lawn mowers.

It is well known that each year a great many persons are injured seriously while working with rotary type lawn mowers, wherein the blade swings with a great velocity and power so that it very easily cuts through a shoe in case a person accidentally gets his foot underneath the machine, resulting often in amputations of toes. Sometimes a person servicing the running mower gets his fingers too close to the blade so that this situation is very dangerous. Heretofore mower manufacturers have not developed a rotary type mower wherein the blade cannot be touched while running, so that this situation is therefore in want of an improvement.

Accordingly, it is a principal object of the present invention to provide a cage-like enclosure that is mountable on the mower so to prevent ready access of a person to accidentally contact the rotating blade.

Another object is to provide a protective blade enclosure which extends downward lower than the blade elevation so if a front end of a shoe accidentally gets underneath, it will contact the rotatable enclosure instead of the blade, and the enclosure will quickly push the shoe out and away.

Yet another object is to provide a rotatable protective blade enclosure which also prevents the blade from hitting any upwardly projecting rocks, thus preventing blade damage, and wherein the cage-like enclosure will prevent small stones from being thrown by the blade in all directions that might otherwise strike a person.

Yet a further object is to provide a revolvable protective blade enclosure that does not in any way interfere with the normal grass cutting operation and which can be easily and quickly installed on any rotary type lawn mower.

Other objects are to provide a revolving protective blade enclosure which is simple in design, inexpensive to manufacture, rugged in construction, easy to use, and efficient in operation.

These and other objects will be readily evident upon a study of the following specification and the accompanying drawing, wherein:

FIG. 3 is a cross-sectional view taken on line 3—3 of FIG. 1, looking in the direction of the arrows;

FIG. 4 is a bottom view of the enclosure;

FIG. 5 is a top perspective view thereof shown per se; and

FIG. 6 is an enlarged fragmentary vertical sectional view taken on line 6—6 of FIG. 3, looking in the direction of the arrows.

Figure 1:
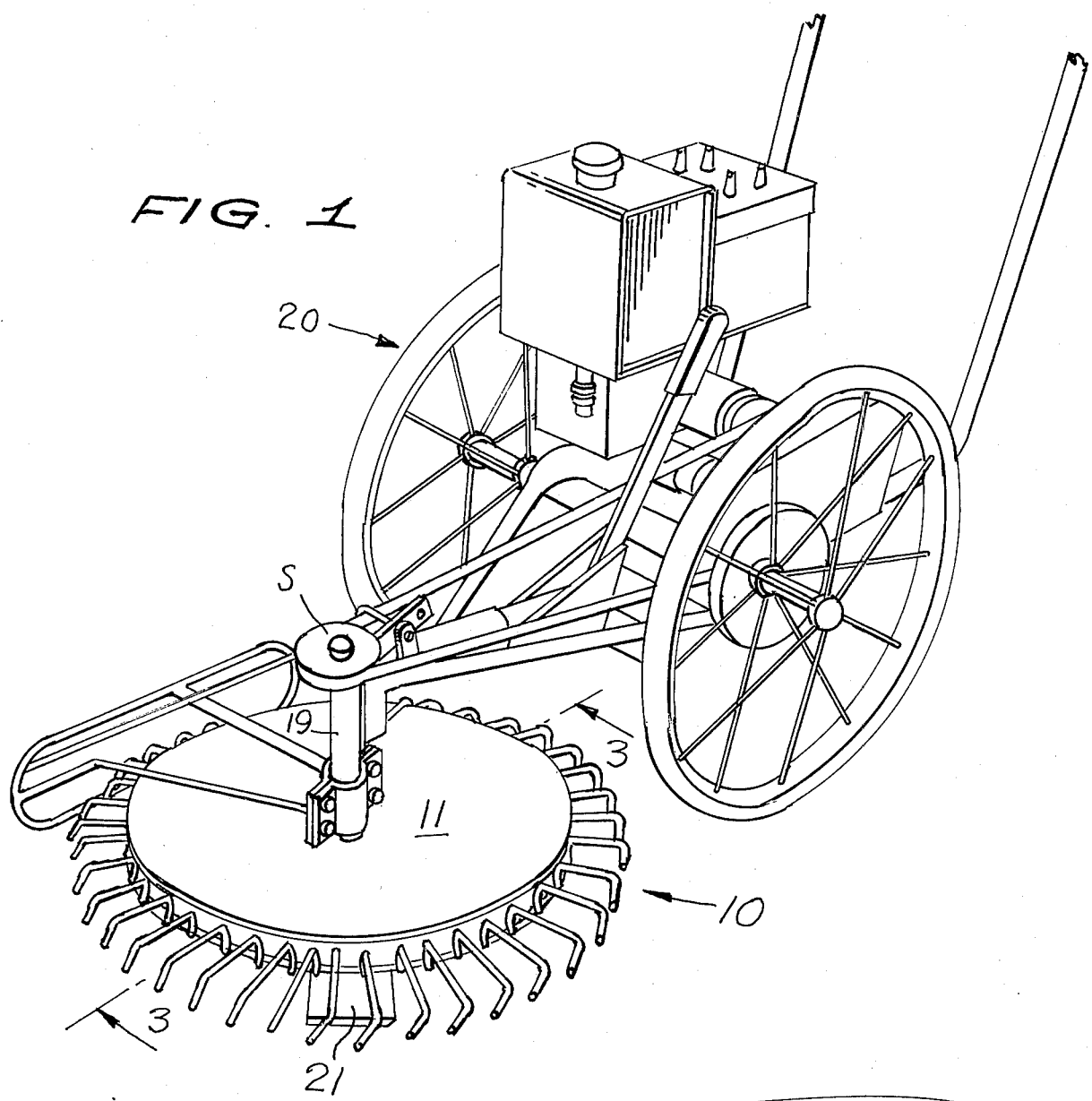
FIG. 1 is a perspective view of the present invention shown installed on a rotary type lawn mower.
Figure 2:
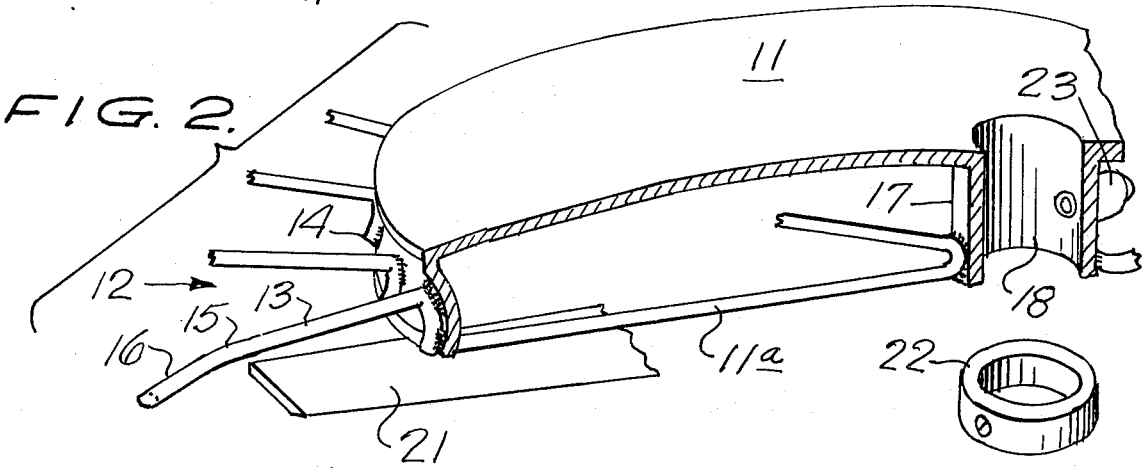
FIG. 2 is a fragmentary perspective view of the enclosure shown in cross section.

Referring now to the drawings in detail wherein like reference characters indicate like parts throughout the several figures, the reference numeral 10 indicates generally a revolving protective blade enclosure according to the present invention. The enclosure 10 includes a circular shield 11 of sheet metal having steel fingers 12 welded to its periphery. Each finger 12 has a generally horizontal leg 13 that extends radially from the peripheral edge 14 of the shield 11, a bend 15 at the end of the leg 13 and a downward leg 16 at the other end of the bend 15. The downward leg 16 angles outwardly about 15° and backwardly about 15° from a vertical plane in both directions, as is evident in the drawings. The fingers are made of steel wire. The inner end 13' of the finger 12 is bent downwardly to provide a firm engagement with the edge 14 of the shield 11.

A central sleeve 17 integral with the shield 11 is provided with opening 18 so to fit on a motor shaft housing 19 of the rotary mower 20 and is positioned above the mower blade 21 carried by the motor shaft 3, so that the same is caged in the enclosure. A spacer collar 22 is detachably secured to the housing 19 below the sleeve 17 to support the enclosure 10 in its properly spaced relation to the blade 21. Spokes 11a brace the sleeve and shield edge.

A grease fitting 23 may be included so to lubricate the opening 18.

In operative use, it is now evident that the rotating blade is fully accessible to the grass for cutting but is otherwise enclosed by the freely rotatable enclosure so to not be contacted by a person or projecting objects such as rocks.

I claim:

1. A lawn mower comprising a blade, a powered shaft to drive said blade, said shaft surrounded by a stationary shaft housing, a freely rotatable blade enclosure journalled on said shaft housing and supported by a collar which is attached to a lower portion of said shaft housing, said blade enclosure including a shield member radiating outwardly from said shaft housing and terminating in a peripheral edge which supports outwardly and downward disposed fingers which are inclined from the verticle and extend downwardly below the plane of said blade and which serve to isolate said blade from an area outside of said shield and causes said enclosure to revolve by the reaction of said fingers against grass.

2. The device of claim 1 in which said fingers are disposed at an angle of substantially 15° from the horizontal and vertical planes, respectively.

3. The device of claim 1 in which said shield further includes spokes which extend from said peripheral edge to said opening to provide additional support for said shield.

* * * * *